Patented Nov. 20, 1928.

1,692,524

UNITED STATES PATENT OFFICE.

HARRY M. WEBER, OF MONTCLAIR, NEW JERSEY, ASSIGNOR TO ELLIS-FOSTER COMPANY, A CORPORATION OF NEW JERSEY.

PLASTIC RESINOUS MATERIAL AND PROCESS OF MAKING SAME.

No Drawing. Application filed January 12, 1924 Serial No. 685,887.

This invention relates to a plastic molding composition or laminated press board comprising respectively appropriate filling or sheet material incorporated with a cresylate resin binding agent.

The type of molding composition of the present invention is one which when hot pressed exhibits initially a high degree of flowability followed by a curing effect resulting in a product which even when hot is rigid or "set".

The present invention in its broader aspects relates to a method of making molding compositions from phenolic substances generally but in its specific aspects, which will be particularly emphasized in the present application, it relates to compositions containing a resinous binder prepared from cresol (cresylic acid, tar acid, etc.), a basic substance, and formaldehyde or equivalent substance.

For the purpose of comparison in order to indicate the improvement which I have made in this art I take occasion to refer to a type of resinous binder made from phenol and formaldehyde in the presence of a restricted amount of a catalyst. Products of this sort have been used to a large extent commercially. In making these products it is customary to use phenol as the sole phenolic body or to use a large proportion of phenol, together with some cresol. Increase in the cresol content beyond a certain amount usually results in complaints by the molder supplied with such inferior material. Although several processes and patents refer to compositions made from phenol and cresol, or cresol (cresylic acid) is stated casually to be the equivalent of phenol, as a matter of fact, the products made from phenol alone, because of their reactivity, good flowing qualities and for other reasons, have come to be looked upon as important if not essential elements of such molding compositions, adequate to meet the demands of present day commercial molding.

For a considerable number of years phenol has been available cheaply due to an excess of war supplies. But this source is now practically at an end and to meet the demand for phenol it probably will have to be made by synthetic processes at a cost much greater than that of phenol under normal conditions in years past.

On the other hand cresol (cresylic acid) is available in large quantities. It has been supposed, because of its uncertain effect in molding compositions, and for various other reasons, that cresol, as stated, could not by itself be used to meet the commercial requirements of the present time unless it be admixed with a considerable amount of phenol in the preparation of resinous condensation products formed in the presence of a restricted amount of alkaline catalyst. This requirement may have been necessary under former methods of preparation which involve reacting on phenolic bodies with formaldehyde in the presence of an alkaline catalyst not in excess of a small fraction of a molecular proportion of the phenolic body employed. Prior investigators as well as others have generally used a base in small or what may be termed catalytic proportions. In the present invention I prefer to employ large quantities of a base, which by following the procedures I have laid down herein, makes possible the successful employment of the cheaper cresols in place of phenol; meeting the very exacting commercial requirements established in the molding field.

Instead of obtaining from cresol the expected inferior molding composition I obtain one which in some respects has superior qualities and this is accomplished without the addition of any phenol whatsoever thereby resulting in a substantial saving in cost of manufacture. Molding compositions having the properties of my product enjoy a field of use which expands very rapidly, in fact in great disproportion as the price of the molding composition is reduced. Hence I believe the use of cresol in the manner which I am about to describe constitutes an improvement of great value in that it develops a much wider field of utility for molded products. I do not in all cases exclude the possibility of using phenol to some extent, provided it is not present in such an amount as to detract from the properties of my product. The presence of phenol as an impurity in the cresol is not objectionable. While I prefer as stated to use cresol alone I do not wish my process to be evaded by anyone who seeks to do this by the addition of some phenol as there are certain features of the invention which do not relate to the kind of phenolic body employed but to methods of incorporating or reacting on the materials irrespective of their phenolic nature in order to produce compositions capable of meeting the very specific and exacting requirements of commercial molding plants.

With respect to the cresol employed it may be noted that a mixture of meta and para cresol, well known in commerce as metaparacresol and containing these two constituents in proportions which usually range from 40 per cent of one to 60 per cent of the other is especially serviceable. However metaparacresol is more expensive than mixtures of the three cresols, that is the ortho, meta and para cresols and I may also employ a commercial mixture known as tar acids having a content of say 97–99 per cent of phenolic bodies. The use of these cresols in conjunction with some of the xylenols also is feasible.

The alkaline material which I may employ for example in full molecular proportion is one which preferably will combine with the cresol to form a cresylate. Thus I may use proportions of materials which will form for example the cresylates of barium, or calcium, strontium, magnesium and the like. Preferably I employ magnesium oxide or hydrate.

In the first place I prefer to employ heavy magnesium oxide or calcined magnesium carbonate of a heavy character rather than the very light pharmaceutical type of magnesium oxide on the market. Preferably this heavy magnesium oxide is ground in a ball mill with formaldehyde to bring about a certain reaction, the nature of which is not entirely clear but which apparently involves the hydration and change in the magnesium material with apparent reaction to some extent with the formaldehyde itself. When this heavy oxide of magnesia is mixed with formaldehyde solution the oxide settles almost immediately. On grinding the magnesia and formaldehyde solution in a ball mill a milk or cream is obtained. When prepared in the preferred manner this milk or cream on standing will thicken forming a paste or jelly. Grinding magnesium oxide or analogous base in formaldehyde solution or in some cases in cresol forms a specific preferred feature of the present invention.

Magnesium oxide material or calcined dolomite ground in aqueous formaldehyde is the form I preferably employ for reaction with the cresol. Thus formaldehyde solution, that is the ordinary commercial 40 per cent grade, may be mixed with magnesium oxide in proportions such that there will be one mol. of magnesium compound calculated as magnesium oxide to one mol. of cresol employed in reaction mixture used for making the resin. The proportion of the formaldehyde of this strength to the cresol may be say 90 to 100 parts by weight for each 100 parts of cresol taken.

By grinding a mixture of magnesium oxide and aqueous formaldehyde under these conditions a product is obtained which may be mixed with the cresol and reaction allowed to proceed to the formation of the magnesium cresylate resin or equivalent resinous material obtainable according to my process.

While cresol, as stated, has been regarded as an uncertain sort of phenolic compound in comparison with phenol itself I have found its activity with a full mol. of the magnesium material prepared in this way to be extraordinarily great. The magnesium formaldehyde reagent is capable of bringing about reaction in a vigorous manner and of carrying it to a rapid conclusion yielding a resinous substance which is quite resistant to heat. Furthermore, contrary to expectations, this large proportion of so vigorous a reagent does not yield the worthless products which Baekeland has indicated to result.

Instead a hard tough fairly infusible resin is obtained, which is capable of binding together various filling materials or sheets of paper to form molded products or laminated press board respectively of great value and made at a comparatively low cost of manufacture from materials which are freely available. The vigor of the magnesium oxide material in its reaction with cresol and formaldehyde calls for a careful control over the operation which I will set forth hereinafter in great detail.

In view of the deficiency of information available in the art I have determined to provide a very full description of my process in order that anyone having the proper chemical knowledge can manufacture hereunder in a reasonable time molding compositions of excellent quality.

The problem which has offered me the greatest difficulty and to the solution of which I have made an enormous number of experiments is that of producing flowability conjoined with rapid curing or setting.

Flowability is that softening and penetrating quality of the resinous binder under the influence of heat which is necessary in order to cover the particles of filler and cause a good impress or replica to be made. The resin should become very liquid and penetrating on heating.

*Rate of setting.*—A composition which initially is readily flowable on heating but which will cure or set and become rigid in only a few minutes time hardly ever exceeding 6 to 10 minutes total time in the hot press and usually 5 minutes or less, is demanded for pieces of average thickness say ⅛ to ¼ of an inch and if in addition, subsequent cooling in the press may be avoided an improvement results.

My observations and experiments led me to the conclusion contrary to what is taught by the prior art that cooling in the mold as a step in the molding operation can be eliminated in making articles prepared according to the present invention.

I have made compositions according to this invention which when hot pressed at

160° C. for 3 to 5 minutes could be removed hot from the mold without the formation of blisters or any signs of warping. In short a rigid article free from blisters comes directly from the hot mold. It is true that products made from phenol and formaldehyde with a small amount of alkaline catalyst (which commercially by the way almost invariably includes hexamethylenetetramine) can be taken hot from the mold in a cured state and this is the practice to some extent but generally speaking the danger from ammonia blisters due to the use of hexamethylenetetramine and the possibility of warping makes the step of cold pressing desirable. Laminated press board offers even greater difficulty.

It is not necessary in most cases to produce a wholly infusible product. If the fusing point of the resinous binder is substantially above that of the temperature of the mold the composition will serve the purpose of the molder in the majority of cases. If the product is hard enough at the molding temperature to be removed hot without danger of deformation so that the molder is able immediately to extract the article from the hot mold and not have to wait for cooling, however slight, a saving in time is effected and in consequence the output from molds, which are necessarily expensive, is increased.

In the course of my experiments involving the production of many hundreds of molded pieces in accordance with the present invention I have never observed the formation of blisters on withdrawal of the molded specimen from the mold while still at the molding temperature. In any event the presence of ammonia from whatever source derived is responsible for blistering which I have observed takes place very readily when testing commercial samples of such molding composition in comparison with my own non-blistering product under like conditions.

In addition to preferring to have ammonia or hexamethylenetetramine absent from my molding composition because of the blistering action I also prefer to avoid the use of water-soluble alkalies such as caustic soda or caustic potash. These have been recommended by DeLaire, Baekeland and others but I consider the presence of such water-soluble compounds to be detrimental in several respects. In fact any uncombined hexamethylenetetramine or similar compound remaining soluble in water even after protracted exposure to air is in my opinion objectionable. In the present invention preference therefore is given to the use of alkaline earth bases such as calcium or barium oxide or hydrate, these having the advantage that any free base in the composition on exposure to air at the surface of the molded article will become carbonated to a water insoluble substance. While therefore with ammonia and caustic alkalies even small amounts are deleterious for many purposes the case is different with bases forming water-insoluble carbonates. These may be used in substantial proportions with the resultant advantage of quick curing. Magnesium oxide or hydrate is in a class by itself since basic compounds of this nature are practically insoluble in water yet exert a peculiar and specific resinifying effect, which I consider remarkable in its character. The presence of a substantial proportion of magnesium hydrate is therefore beneficial in several respects.

Among other properties of interest I may note that the presence of a small amount of moisture is not detrimental to the molding qualities of the composition. I had expected that moisture would cause blisters in a manner similar to ammonia but I find this is not the case. I have allowed the molding composition in a moist state to dry over night simply by spreading it in a thin layer exposed to the air at room temperature. The next day, although feeling dry to the touch, considerable moisture, for example 5 to 10 per cent, was present. Yet this composition molded well without disturbance in the mold and without blistering.

Thus when using my composition it does not become necessary to dry out the filler nor the composition itself to a high degree. For example ordinary commercial fillers such as china clay or ground wood containing a content of moisture such as may result from absorption of moisture from very humid air may be used without difficulty. In a similar manner it is not necessary to eliminate all traces of moisture from the resin. When the product is to be used for electrical insulating purposes a fairly dry composition of course is desirable. Furthermore a somewhat better surface finish is obtained when the composition is dry. The fact remains however that moisture does not cause the same molding difficulty that is brought about by the presence of ammonia. The percentage of culls or rejects by my process is I believe substantially lower.

In practically all plastic molding compositions it is customary to incorporate a filler in the composition. Fillers may be of a mineral nature, such as clay, talc, whiting, silica, asbestos powder or fibre or mica, or an organic filler may be used such as leather, hair, sawdust, especially a fine sawdust or ground-wood sometimes called wood flour. Other organic fillers are cotton or silk flock or wood fibre. Some organic fillers, such as hair or leather may require a reduction in molding temperature. In general, organic fillers should be molded at temperatures lower than is possible with inorganic ones. Since the filler is usually considerably cheaper than the binder the cost of the composition is lowered in proportion to the amount of filler present. This proportion of filler varies with its density and with the spreading or penetrating powers of the resin. A substance which is not porous such as china clay may be used in much larger proportion than an absorptive material like ground wood or infusorial earth.

The resin may be incorporated with the filler in various ways such as by the use of solutions. In the present invention when using an absorptive filler, e. g. wood flour I prefer to incorporate the resin in such a way that the fibers are coated but not necessarily completely impregnated with the resin. The wood flour is much cheaper than the resin and the use of a maximum amount of the former is desirable on account of reduction in cost. By coating the fibres as for example by agitating the filler in a suitable apparatus of the type of a Werner-Pfleiderer mixer and introducing the resin in a hot molten condition the fibres may be well coated without necessarily forcing the resin into the interior canals of this type of filler. Such a composition usually molds better in that the resin, when used in minimum proportion, appears to flow more freely and give a more exact impress and improved surface finish. Methods which involve impregnation of the fibre with alcoholic or of aqueous solutions of the resin or methods of working on hot milling rolls for long periods of time to bring about impregnation of the fibre, are not as useful, in my opinion, as the procedure I have described. I believe the coating of a porous particle without much impregnation thereby leaving an air cell may afford a structure which is superior in certain electrical applications and elsewhere.

Sometimes however, especially when of a porous character, the filler may be impregnated by the use of a solution of the resin or by mixing on milling rolls such as are used in rubber milling operations and subsequently, if desired, the impregnated articles may be coated with a highly fusible and reactive resin.

In carrying out my process I preferably heat and agitate the raw materials without filler to bring about the formation of a resinous substance which is fairly soft when cold but moderately liquid when hot, being made preferably from aqueous formaldehyde, in order to save the cost of using more expensive forms of this material. The water of the formaldehyde solution should be largely removed and this preferably may be done by drying the resinous material in a vacuum dryer. The hot liquid resin is then preferably incorporated with a filler, which likewise may be hot, in a powerful mixing apparatus. The latter may be heated if desired.

The preparation of the resin involves the consideration of many variables. For example in carrying out my process I have found the following variables should not be disregarded.
1. Kind of phenolic body employed.
2. Kind of basic material.
3. Proportion of basic material.
4. Proportion of formaldehyde.
5. Time of heating of the reaction mixture.
6. Temperature of the reaction mixture.
7. Time of drying of the resin.
8. Temperature of drying of the resin.
9. Effect of filler.
10. Proportion of filler.

These variables all require consideration and adjustment with respect to each other in order to produce a molding composition which meets the requirements of present day molding operations.

A difficulty which has confronted me and caused me to make a large number of experiments is that which I term over-curing. As previously indicated there must be a balanced condition in that the resin must be very fusible when initially heated but must set rapidly in order to be removed from the mold in a hot condition. These two requirements are inimical. Extreme fusibility results in too slow curing or setting. To obtain successful results in a commercial way the details which I hereinafter set forth should be followed with care.

The difficulty of overcuring manifests itself by a floury surface, leading one to conclude that there is an insufficient amount of resin to coat the particles or fibres of the filler. Yet this surface impairment may occur even when the resin is present in predominating amount. The difficulty apparently is due to contact of some of the particles with the hot mold for too long a time prior to the application of pressure. The heat causes reaction of the resin before the particles have been brought into close contact by pressing resulting in the resin coating becoming glazed and set. The particles of the composition therefore do not fuse and weld together when pressure is applied. This defect may not appear when using small molds but is frequently observed with larger molds which are more difficult to heat evenly. Over-curing may then be expected at the points where the transmission of heat is greatest.

Over-curing may be caused by too long a time of heating together of the reacting raw materials or too high a temperature at this stage, or because too long a time or too high a temperature is used in drying. The presence of an excessive proportion of filler also sometimes gives an appearance somewhat similar to over-curing effects.

The strength of the molded specimen usually increases up to a certain point with increasing additions of filler. Too low a percentage of filler, as is the case with many other resins, hard rubber and the like, fails to yield a product of the desired commercial properties. Too large a proportion of filler also is disadvantageous especially in securing a good flow of the resin and coverage of the filler. The maximum amount of filler of any given type may be determined by making simple strength tests which need not be outlined here.

Another difficulty which may arise from time to time is that of sticking to the mold. This may be remedied by the addition of one or two per cent of a water insoluble soap such as aluminum palmitate, magnesium or zinc stearate and the like. The metallic soap should be added in the form of a very fine powder to the batch at the time of mixing resin and filler, or it may be ground with the finished molding composition to flour the particles with this substance.

In some cases especially when using lime, barium or magnesium oxides or hydrates as the base the addition of a water-soluble soap such as ordinary laundry soap permits of the formation of an insoluble soap and minimizes sticking.

The proportion of formaldehyde should be carefully adjusted. Ordinarily aqueous formaldehyde having a content of 37 to 40 per cent of actual formaldehyde may be employed with cresol in the proportion of about equal parts by weight. Rarely should it be less, although in some cases 90 parts or thereabouts of formaldehyde solution may be used to 100 parts of cresol. In the presence of a full mol. of magnesium base the formaldehyde combines very rapidly during the heating or cooking operation so that in the course of a few minutes the odor of formaldehyde disappears. However, some formaldehyde may be liberated or eliminated during drying and when a vacuum dryer is employed such formaldehyde may be recovered if the quantity warrants.

The following illustrations serve to show the effect of the various factors mentioned above which enter into the production of a successful commercial molding composition and plainly illustrate a number of differences between cresol (cresylic acid) and phenol. The proportions given are by weight.

In Table 1 the resin obtained from different phenolic bodies is shown. The experiments as nearly as possible were carried out under the same conditions, merely varying the time that the solution is boiled in each case. It will be noted that in the preparation of the cresol or tar acid resin boiling the constituents for only 20 minutes and subsequently drying, resulted in an over-cured product, whereas when the phenol solution was boiled for 45 minutes a resin resulted having satisfactory molding properties and it required 75 minutes boiling to affect the flow of the resin made from phenol.

Table 1.

| No. | 3192 | 3232 | 3193 |
|---|---|---|---|
| Kind of phenolic body | Phenol 100 | Tar acid 100 | Phenol 100 |
| Formaldehyde. | 100 | 100 | 110. |
| Basic material. | MgO 20 | MgO 20 | MgO 20. |
| Time of heating. | 75 minutes | 20 minutes | 45 minutes. |
| Temp. of heating. | Boiling | Boiling | Boiling. |
| State of solution. | Turbid. No separation. | Turbid. No separation. | Turbid. No separation. |
| Drying conditions. | In vacuo to 90° C. with filler. | In vacuo to 90° C. with filler. | In vacuo to 90° C. with filler. |
| Results on molding. | Insufficient flow, cured in 4 min. at 160° C. Good surface. | Poor flow, overcured at 160° C. molded article had uncoated fibres on surface. | Good flow, cured in 4 min. at 160° C. Good surface. |

In the above table and in the following tables the word tar acid is used to denote a mixture of cresols containing approximately 35 per cent orthocresol and 65 per cent metaparacresol.

The effect of varying the base is shown in Table 2, some of the salts of magnesium being given for purposes of comparison.

Table 2.

| No. | 3185 | 3197 | 3186 |
|---|---|---|---|
| Kind of phenolic body | Phenol 100 | Phenol 100 | Phenol 100 |
| Formaldehyde. | 100 | 106 | 100. |
| Basic material. | MgCO$_3$ 45 | MgO 20 | MgSO$_4$+H$_2$O 130. |
| Time of heating. | 2 hours | 1 hour | 1 hour. |
| Temp. of heating. | Boiling | Boiling | Boiling. |
| State of solution. | Turbid with precipitate. | Turbid. No separation. | Separated into two layers. No resin formation observed. |
| Drying conditions. | With filler in vacuo to 90° C. | With filler in vacuo to 90° C. | |
| Results on molding. | Did not cure in 7 min. at 160° C. good flow, good surface. Softened on heating. | Good flow, cured in less than 4 min. at 160° C. Good surface, hard, did not soften on heating. | |

Table 2.—(Continued.)

| No. | 3181 | 3170 | 3274 |
|---|---|---|---|
| Kind of phenolic body | Tar acid 100 | Tar acid 100 | Metaparacresol 100 |
| Formaldehyde. | 100 | 100 | 81. |
| Basic material. | Mg(OH)$_2$ 28 | Ca(OH)$_2$+ Mg(OH)$_2$ 27½ | MgO 18. |
| Time of heating. | 30 min. | 20 min. | 50 min. |
| Temp. of heating. | 90–95° C. | 90–95° C. | 70° C. |
| State of solution. | Turbid. No separation. | Turbid. | Turbid. |
| Drying conditions. | With filler to 90° C. in vacuo. | With filler to 70° C. in vacuo. | With filler to 90° C. in vacuo. |
| Results on molding. | Good flow, cured in 5 min. at 160° C. Good surface. | Poor flow, resin overcured at 160° C. fibres exposed on surface of molded article. | Poor flow, overcured at 160° C., fibres exposed on surface of molded article. |

Table 3 plainly shows the effect of varying the proportion of formaldehyde. The molding composition obtained with less than 90 parts of commercial formaldehyde to 100 parts of cresol being under-cured. It will be noted that the flow of the molding composition was poor in every case, due to the high temperature at which the constituents were heated, the effect of which is shown in Table 5.

Table 3.

| No. | Kind of phenolic body | Formaldehyde | Basic material | Time of heating | Temp. of heating | State of solution | Drying conditions | Results on molding |
|---|---|---|---|---|---|---|---|---|
| 3272 | Metaparacresol 100. | 90 | MgO 20 | 20 minutes | 90–95° C. | Turbid. No separation. | In vacuo to 75° C. with filler. | Poor flow, cured in less than 5 min. No fibres exposed on surface. Matt finish, fair surface. |
| 3255 | Tar acid 100 | 50 | MgO 20 | 20 minutes | 90–95° C. | Turbid. No separation. | In vacuo to 75° C. with filler. | Poor flow, disc undercured at end of 5 min. at 160° C. Cresol given off during molding and drying. |
| 3256 | Tar acid 100 | 75 | MgO 20 | 20 minutes | 90–95° C. | Turbid. No separation. | In vacuo to 75° C. with filler. | Poor flow, disc undercured at end of 5 min. at 160° C. Cresol given off during molding and drying. |
| 3257 | Tar acid 100 | 90 | MgO 20 | 20 minutes | 90–95° C. | Turbid. No separation. | In vacuo to 75° C. with filler. | Poor flow, disc cured within 5 min. at 160° C. |
| 3253 | Tar acid 100 | 100 | MgO 20 | 20 minutes | 90–95° C. | Turbid. No separation. | In vacuo to 75° C. with filler. | Insufficient flow, over-cured at 160° C. disc having uncoated fibres on surface. |

In order to illustrate the effect of varying the time and temperature of heating the reaction mixture, and the temperature of drying the resinous solution, Tables 4, 5 and 6 are given. The examples as given are of the resin without filler as it is at this point in the production of molding compositions that the results are mostly plainly shown. An exception is experiment 3258 which is given to illustrate the length of time required to effect separation of the resinous and aqueous layers with resultant undesirable effect.

Table 4.

| No. | 3258 | 3273 | 3273 | 3273 |
|---|---|---|---|---|
| Kind of phenolic body. | Tar acid 100 | Metaparacresol 100 | Metaparacresol 100 | Metaparacresol 100 |
| Formaldehyde | 90 | 90 | 90 | 90. |
| Basic material | MgO 20 | MgO 20 | MgO 20 | MgO 20. |
| Time of heating | 90 min. | 10 min. | 30 min. | 50 min. |
| Temp. of heating | 90–95° C. | 70° C. | 70° C. | 70° C. |
| State of solution | Separated into two layers. | Turbid. No separation. | Turbid. No separation. | Turbid. No separation. |
| Drying conditions | In vacuo to 80° C. with filler. | In vacuo to 70° C. without filler. | In vacuo to 70° C. without filler. | In vacuo to 70° C. without filler. |
| State of dried resin | | Viscous oil | Thick viscous liquid | Pasty solid. |
| Results on molding | Poor flow. Over-cured at 160° C. Disc had uncoated fibres on surface. | Flows very freely, cured in less than 5 minutes at 160° C. | Flows very freely, cured in less than 5 minutes at 160° C. | Flows very freely, cured in less than 5 minutes at 160° C. |

Table 5.

| No. | 3285 | 3285 | 3285 |
|---|---|---|---|
| Kind of phenolic body | Metaparacresol 100 | Metaparacresol 100 | Metaparacresol 100 |
| Formaldehyde | 90 | 90 | 90. |
| Basic material | MgO 20 | MgO 20 | MgO 20. |
| Time of heating | 30 min. | 30 min. | 30 min. |
| Temp. of heating | 70° C. | 80° C. | 90° C. |
| State of solution | Turbid. No separation. | Turbid. No separation. | Turbid. No separation. |
| Drying conditions | In vacuo to 90° C. without filler. | In vacuo to 90° C. without filler. | In vacuo to 90° C. without filler. |
| State of dried resin | Soft solid | Hard solid | Hard brittle solid. |
| Results on molding | Slight flow, cured in less than 5 minutes at 160° C. | Very slight flow, cured in less than 3 minutes at 160° C. | No flow, over-cured at 160° C. |

Table 6.

| No. | 3285 | 3285 | 3285 |
|---|---|---|---|
| Kind of phenolic body | Metaparacresol 100 | Metaparacresol 100 | Metaparacresol 100 |
| Formaldehyde | 90 | 90 | 90. |
| Basic material | MgO 20 | MgO 20 | MgO 20. |
| Time of heating | 30 min. | 30 min. | 30 min. |
| Temp. of heating | 70° C. | 70° C. | 70° C. |
| State of solution | Turbid. No separation. | Turbid. No separation. | Turbid. No separation. |
| Drying conditions | In vacuo to 70° C. without filler. | In vacuo to 80° C. without filler. | In vacuo to 90° C. without filler. |
| State of dried resin | Thick viscous liquid. | Pasty solid | Soft solid. |
| Results on molding | Flows very freely, cured in less than 5 min. at 160° C. | Flows, freely cured in less than 5 min. at 160° C. | Slight flow, cured in less than 5 min. at 160° C. |

In Table 7 is shown the effect of drying a composition made by incorporating the aqueous resin solution with wood flour and then drying in vacuo in comparison to a composition prepared by drying the aqueous solution in vacuo and then adding the dried resin to the filler.

Table 7.

| No. | 3281 | 3292 | 3280 | 3280 |
|---|---|---|---|---|
| Kind of Phenolic body | Metaparacresol 75. Tar acid 25 | Metaparacresol 75. Tar acid 25 | Metaparacresol 75. Tar acid 25 | Metaparacresol 75. Tar acid 25 |
| Formaldehyde | 100 | 100 | 100 | 100. |
| Basic material | MgO 20 | MgO 20 | MgO 20 | MgO 20. |
| Time of heating | 20 min | 20 min | 20 min | 20 min. |
| Temp. of heating | 70° C. | 70° C. | 70° C. | 70° C. |
| State of solution | Turbid. No separation | Turbid. No separation | Turbid. No separation | Turbid. No separation. |
| Drying conditions | In vacuo to 78° C. then added filler. | In vacuo to 90° C. then added filler. | In vacuo to 70° C. with filler. | In vacuo to 80° C. with filler. |
| Treatment of composition. | Exposed to air over night | Exposed to air over night | Exposed to air over night | |
| Results on molding | Good flow, cured in 5 minutes at 160° C. Good surface. | Fair flow, indications of overcuring at 160° C. Some pieces had fibres exposed on surface. | Fair flow, cured in 5 minutes at 160° C. Fair surface having a matt finish. | Slight flow, over-cured at 160° C. Fair surface having matt finish and some exposed fibres. |

Upon analysis of the foregoing tables it is evident that with phenol it is possible to obtain a molding composition having suitable properties even with a relatively considerable variation in conditions using a full mol. of base. With cresol (cresylic acid) on the other hand a short period of heating to the boiling point may cause the formation of an over-cured product. Using smaller quantities of a base such as magnesium oxide in for example one-fifth equimolecular proportions, while it is true that a resinous material is obtained, a molding composition prepared from this resin does not cure within the time required in a commercial molding establishment. As shown in Table 2 this under-curing of the molding composition within the required time is also true when a compound of the type of magnesium carbonate is used. The use of a salt of magnesium of the type of magnesium sulphate results in little or no resin formation. With the hydroxide of magnesium a satisfactory resin for the preparation of molding composition is readily obtained when the temperature, at which the initial reaction is carried out, is maintained at 90–95° C. However by merely boiling the constituents in the same proportions an over-cured product results. The conditions for preparation of molding composition where the resin is prepared using hydrated dolomitic lime as the base are again different. As shown in Experiment 3170 the composition prepared according to the conditions given resulted in an over-cured product even though the conditions in heating and drying were somewhat modified to minimize over-curing. With magnesium oxide the same condition holds true as will be discussed later. The proportion of formaldehyde used to the phenolic body affects the curing time of the resulting composition seriously as is shown in Table 3. The conditions in all of these experiments were such as to give an over-cured product provided sufficient formaldehyde was present to combine with the phenol but as noted in Table 3 when the proportion of formaldehyde was reduced below 90 parts of formaldehyde to 100 parts of the phenolic body under-curing resulted and free cresol was given off during the molding operation.

The viscosity or consistency of the resin obtained by varying the time of heating the reacting materials is noted in Table 4 and is directly proportional to the time of heating. I must reiterate that the composition should flow very freely and in order to accomplish this it is necessary that the resinous constituents thereof should be liquid at a practical molding temperature, for example, 140–170° C. so as to thoroughly "wet" the filler and then set to a thermo-rigid body. Resins may be tested in the press for flowing and setting qualities by omitting the filler in the first instance. I have found the following to hold true, namely, a resin which without filler becomes sufficiently liquid at say 160° C. to flow out along the narrow space between plunger and case of the mold when pressure is first applied and remains liquid for 1 or 2 minutes and then becomes so viscous that a pressure of 1000 pounds per square inch can be applied without forcing any more resin from the mold, finally setting (in thickness of say 1/8 to 1/4 inch) to a thermo-rigid body within 5 minutes, is suitable for the production of a molding composition.

Varying the time of heating during initial reaction when perparing the resin affects the flowing property of the resin seriously. By heating initially 30 minutes or more at 70° C. the resin without filler flowed very freely in one case but when incorporated with filler and the composition subsequently molded an article was obtained having the appearance of uncoated fibres at the surface and lacking in strength.

The temperature at which the resinous material or the composition is dried to remove water or volatile solvent reduces the flowing properties more or less in inverse ratio to the temperature and accelerates the curing properties of the resin more or less proportionally to the temperature. In table 5 the effect of temperature at which the material is reacted is shown. The drying conditions here were higher than were subsequently proven to be practical for the composition in question but the data serve to show the effect of the temperature of intial heating. In Table 6 the effect of drying temperature above referred to is shown and the consistency of the resulting resin may be expressed roughly as inversely proportional to the drying temperature.

In any previous publication coming to my knowledge no great stress has been laid on whether a filler should be added to the resinous solution before or after the moisture or solvent has been removed but I have found that this plays a not unimportant part in the production of a successful molding composition with cresol. For example in Table 1 Experiment 3193 where phenol was reacted with formaldehyde and magnesium oxide and then incorporated with the wood flour filler and dried a satisfactory molding composition was obtained. In Table 7 is shown the deleterious effect of incorporating the filler before drying of the resinous solution. In Experiment 3281 in which the resin was first dried then mixed with the filler a molding composition having satisfactory properties was obtained, while as shown in Experiment 3280 the addition of the filler to the solution of the resin and then drying resulted in a composition having unsatisfactory properties even though the temperature of drying the composition was lower than when the resin was first dried and then mixed with the filler.

As an illustration of the preferred method of preparing molding composition the following is given. 90 parts formaldehyde, 40 percent solution, was ground with 20 parts of magnesium oxide in a pebble mill for 2 hours. The ground mixture was then added to 100 parts metaparacresol and the mixture heated for 20 minutes maintaining the temperature at 70° C. An exothermic reaction took place and it was necessary to cool the mixture through most of the heating period. The resinous solution was placed in a vacuum dryer and evaporated under 28 inches vacuum until the temperature of the resinous mass reached 70° C. The hot viscous resinous material was then mixed with an equal weight of wood flour in a Werner-Pfleiderer mixer for one hour or until the particles of the wood flour had been thoroughly coated with the resin. A small quantity of moisture remained in the composition and this was removed by allowing the composition to stand exposed to the dry air at room temperature for 12 hours. The composition molded successfully at a press temperature of 160° C. flowing freely, curing to a thermo-rigid body within 5 minutes and forming a good fin.

The presence of orthocresol in the cresylic body used for the preparation of a resin modifies the flowing qualities and affects the curing properties of the resin seriously. Orthocresol, when reacted with an equal amount of formaldehyde and a molecular proportion of ground magnesium oxide, gave a resin which upon molding flowed so freely that it was forced out of an ordinary mold without indications of setting. When calcium oxide is used in place of the magnesium oxide as the basic material the resin obtained flowed very freely but set after a prolonged period of heating, forming a porous infusible resin which can readily be powdered. The presence of orthocresol in commercial cresol (cresylic acid) must therefore be taken into consideration but under the proper conditions a practical molding composition can be obtained. For example 100 parts of formaldehyde 40 per cent solution was ground with 20 grams of magnesium oxide in a pebble mill for 2 hours and the resulting mixture added to 100 parts of commercial cresylic acid containing 35 parts of orthocresol, 40 parts of metacresol, and 25 parts of paracresol. The mixture was maintained at a temperature of 70° C. for a period of 20 minutes and the resulting resinous solution dried in a vacuum dryer under 28 inches vacuum until the temperature of the resin reached 70° C. The dried resin was mixed with an equal weight of wood flour in a Werner-Pfleiderer mixer for a period of 1 hour. The composition was then air-dried at room temperature for 12 hours. Upon molding, this composition was found to stick slightly to the mold but otherwise had the required flow and curing time, namely 5 minutes. Sticking of the composition to the mold may be overcome by addition of 1 per cent of aluminum palmitate and this can be added during the mixture of the dried resin and the wood flour or may be added subsequently by grinding the dried composition with the palmitate in a pebble mill.

It may of course be possible to produce a molded article from orthocresol by the use of the so-called "bakelizer" where the resin is heated under pressure for an impractical length of time but for the purposes of the present invention involving high speed molding the use of orthocresol alone is not desirable.

In the preferred form of my invention a resin is obtained by reacting on meta and para cresol (with or without 5 or 10 per cent, more or less, of orthocresol) with approximately an equal amount of formaldehyde solution (40 per cent) ground with a base, preferably in excess of ¼ mol. (calculated on cresol used), preferably more nearly approximating a full mol. in the case of magnesium oxide or hydrate, the time and temperature of heating and drying being regulated as described to secure a very flowable product on press-heating but which sets in a few minutes at 150–170° C. to a thermo-rigid body; such resin being preferably incorporated with a porous filler, without substantially impregnating the latter; whereby a maximum amount of filler may be incorporated; such composition when molded in a heated mold at 160° C. being capable of flowing readily and because of this property of extruding to a slight extent along the movable joints of said mold, thus forming a thin, somewhat flexible fin; said composition when thus shaped into articles having a thickness of ⅛ to ¼ of an inch being capable of setting to a rigid state at the molding temperature of 150–170° C. in a period of less than seven minutes.

What I claim is:—

1. In the process of making resinous molding composition the step which comprises grinding magnesium oxide with formaldehyde.

2. In the process of making molding composition, the steps which comprise reacting on cresylic acid containing largely meta and para cresol, with a ground-together reagent of magnesium oxide and aqueous formaldehyde, drying the reaction product, the conditions during the reaction and drying steps being such as to time of treatment and temperature, as to form a resin which is sufficiently fluid when warm to be mixed with filling material, incorporating the warm fluid resin with filler to substantially coat the latter and adding a small amount of a compound capable of preventing sticking in the mold during molding.

3. In the process of making resinous molding composition, the step which comprises grinding magnesium oxide with formaldehyde until a cream is formed.

4. In the process of making resinous molding composition, the steps which comprise grinding magnesium oxide with formaldehyde until a cream is formed, and converting such cream into a paste.

5. A process of making resinous material which comprises grinding magnesium oxide with formaldehyde, and reacting such ground mixture with cresylic acid.

6. A process of making resinous material which comprises grinding magnesium oxide with formaldehyde to form a cream, and reacting such cream with a cresol.

7. A composition for use in making resinous material which comprises magnesium oxide ground with formaldehyde.

8. A composition for use in making resinous material which comprises magnesium oxide ground with formaldehyde to form a cream.

HARRY M. WEBER.